No. 882,098. PATENTED MAR. 17, 1908.
J. CHIAL.
WATER TANK.
APPLICATION FILED MAR. 25, 1907.
2 SHEETS—SHEET 1.
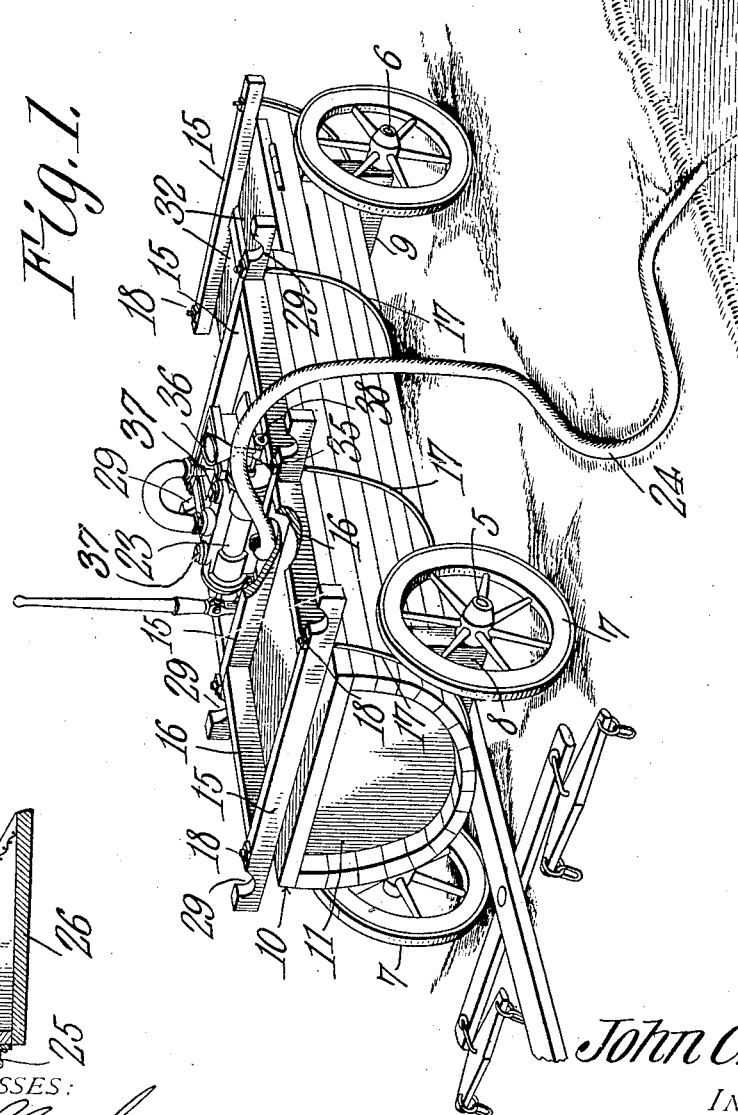
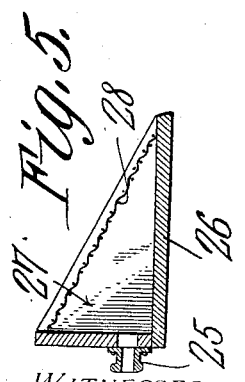
John Chial,
INVENTOR.
WITNESSES:
By C. A. Snow & Co.
ATTORNEYS
THE NORRIS PETERS CO., WASHINGTON, D. C.

No. 882,098. PATENTED MAR. 17, 1908.
J. CHIAL.
WATER TANK.
APPLICATION FILED MAR. 25, 1907.
2 SHEETS—SHEET 2.
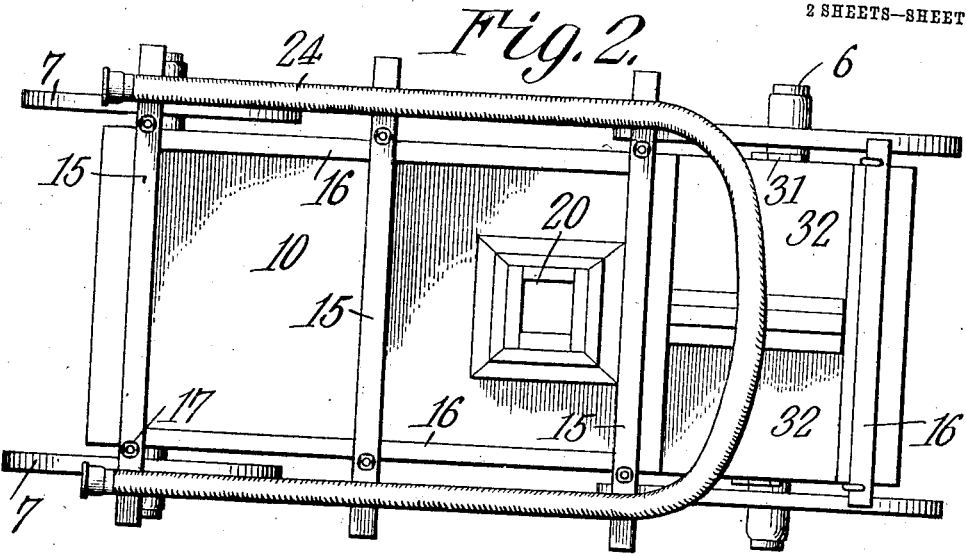
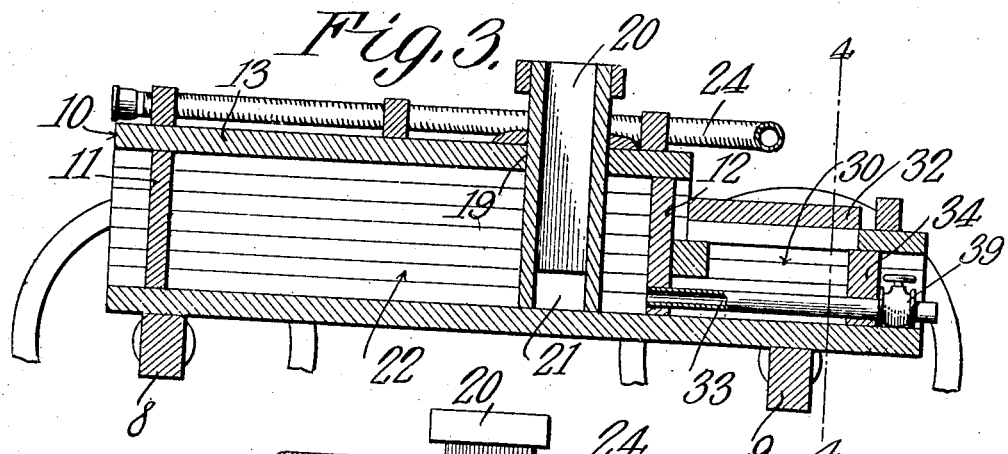
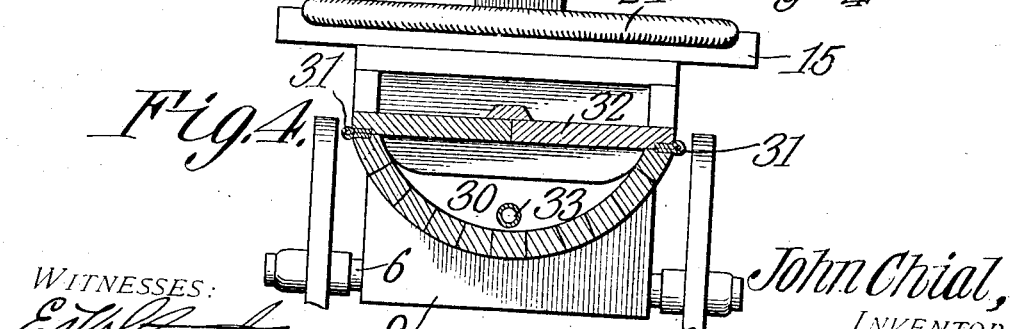
WITNESSES:
John Chial,
INVENTOR.
By C. A. Snow & Co.
ATTORNEYS

UNITED STATES PATENT OFFICE.

JOHN CHIAL, OF LAKE PARK, MINNESOTA.

WATER-TANK.

No. 882,098.   Specification of Letters Patent.   Patented March 17, 1908.

Application filed March 25, 1907. Serial No. 364,345.

*To all whom it may concern:*

Be it known that I, JOHN CHIAL, a citizen of the United States, residing at Lake Park, in the county of Becker and State of Minnesota, have invented a new and useful Water-Tank, of which the following is a specification.

This invention relates to liquid containing tanks and has for its object to provide a strong, durable tank of this character especially designed for hauling or transporting water from a stream or other source of supply to a traction engine, threshing machine or the like.

A further object of the invention is to provide a tank having a pump mounted thereon and provided with a water conducting pipe or hose, the latter being equipped with a novel form of screen so as to effectually prevent mud and sand from the stream from entering the tank when the pump is in operation.

A further object is to provide the tank with a rear compartment or chamber adapted to contain a quantity of water for priming the pump and further to provide a filling spout the upper end of which is extended vertically beyond the top of the tank thereby to prevent the water in the latter from splashing over the edges of the spout when traveling up hills or over rough uneven roads.

Further objects and advantages will appear in the following description, it being understood that various changes in form, proportions and minor details of construction may be resorted to within the scope of the appended claims.

In the accompanying drawings forming a part of this specification: Figure 1 is a perspective view of a water tank constructed in accordance with my invention. Fig. 2 is a top plan view of the same with the pump removed. Fig. 3 is a longitudinal sectional view. Fig. 4 is a transverse sectional view taken on the line 4—4 of Fig. 3. Fig. 5 is a longitudinal sectional view of the screen.

Similar numerals of reference indicate corresponding parts in all of the figures of the drawings.

The improved tank is preferably mounted on a wheeled truck including front and rear axles 5 and 6 on which are journaled the usual traction wheels 7. Secured to the front and rear axles of the truck are bolsters 8 and 9 having their upper faces concaved for the reception of the convex bottom of the liquid containing tank, indicated as a whole at 10. The tank 10 consists of a plurality of longitudinal slats or bars arranged in substantially semi-circular form and fastened in any suitable manner to the segmental end walls 11 and 12, said tank being provided with a cover or closure 13 which is preferably reinforced and strengthened by a plurality of transverse bars 15 and intermediate longitudinal bars 16.

Embracing the curved exterior walls of the tank are reinforcing rods or wires 17 the opposite ends of which are extended vertically through suitable openings in the transverse reinforcing bars 15 and are provided with terminal threads for engagement with clamping nuts 18, which latter bear against the bars 15 so that by rotating said nuts the tension of the reinforcing rods may be regulated and the longitudinal slats locked against accidental displacement.

Extending through a rectangular opening 19 formed in the top of the tank is a filling spout 20, the latter being substantially rectangular in cross section, as shown, and having its upper end projected vertically above the top of the tank so as to prevent the water in the latter from splashing over the spout when traveling up hills or over rough uneven roads. Two of the walls of the spout 20 rest on the bottom of the tank 10 while the adjacent walls thereof are provided with feed openings or recesses 21 through which the water enters into the liquid containing chamber or compartment 22.

Mounted on the top 13 of the tank is a pump 23, preferably of the horizontal type, as shown, said pump being provided with a flexible hose or tube 24 one end of which is connected with the tubular extension 25 of a screen or box 26, the latter being adapted to be positioned in a stream so that the water from the latter may be conveyed through the spout 20 to the chamber or compartment 22. The screen or box 26 is substantially triangular in shape and preferably formed of metal so as to sink to the bottom of the stream, or as far as the length of the hose will permit, said box being provided with an inclined face 27 covered with a strip of wire netting 28 so as to prevent the entrance of sand, gravel, mud, and other foreign matter to the interior of the tank when the pump is operated. By having the box 26 constructed of cast iron or similar metal the box will sink or partially sink to the bottom of the stream with the screen side up, the particular shape of the screen box permitting the same to be used in any depth of water. The opposite ends of the transverse bars 15 are preferably extended laterally beyond the longitudinal bars 16 and are provided with terminal recesses or sockets 29 which form supports for the pipe or hose 24 when the latter is not in use.

One end of the tank is extended longitudinally beyond the adjacent end wall 12 to form an auxiliary liquid receiving compartment 30 adapted to contain a quantity of water for use in priming the pump. Pivotally mounted on the opposite sides of the tank, as indicated at 31 are laterally swinging doors 32 which form a closure for the compartment 30 so as to prevent the escape or evaporation of the water in said tank. Threaded or otherwise fastened in the end wall 12 of the tank is one end of a discharge pipe 33 the opposite end of which extends through the auxiliary compartment 30 and also through the adjacent end wall 34 of said compartment so that the water in the main compartment 22 may be drawn off when desired.

As a means for priming the pump one end of the cylinder 23 is pierced by a pipe or tube 35 having a cup or funnel 36 communicating therewith so that the water from the chamber or compartment 30 may be poured into the cylinder when it is desired to operate the pump without the necessity of removing the cap 37 and adjacent pump valve. A valve 38 is disposed within the pipe or tube 35 for cutting off communication between the funnel and cylinder when the pump is in operation.

When it is desired to fill the tank the pump is positioned on the top of the tank and said pump primed by pouring a small quantity of water from the compartment 30 into the funnel 36, after which the valve 38 is closed and the screen placed in the stream, river or other source of water supply from which it is desired to fill the tank, as best shown in Fig. 1 of the drawing. By manipulating the handle of the pump in the usual manner the water will be sucked up through the screen 28 and hose 24 and thence be discharged through the spout 20 into the compartment 22 of the tank. After the tank has been filled the hose is detached from the pump and the latter positioned within the spout 20, the hose being supported in the sockets 29 when transporting or hauling the water. The water may be removed from the tank either by means of the pump or by rotating the draining plug or faucet 39 so as to permit the water in said tank to be discharged through the pipe 32, as will be readily understood.

While it is preferred to mount the tank on a wheeled truck or the like it is obvious that the same may be positioned on a traction engine, threshing machine or the like without departing from the spirit of the invention.

Having thus described the invention what is claimed is:

1. A tank having main and auxiliary liquid containing chambers, a filling spout carried by the tank and having its lower end disposed within the main chamber and its upper end extended vertically above the top of the tank, a discharge pipe communicating with the main chamber and extending through the auxiliary chamber, and doors forming a closure for the auxiliary chamber.

2. A tank having main and auxiliary liquid containing chambers, a filling spout carried by the tank and having one end thereof extended within the main chamber and provided with oppositely disposed openings and its opposite end projected vertically above the top of the tank, a discharge pipe extending through the auxiliary chamber and communicating with the main chamber, pivoted doors forming a closure for the auxiliary chamber, and means for controlling the discharge of liquid through said pipe.

3. A tank having a liquid containing chamber and provided with a plurality of spaced reinforcing bars the ends of which are recessed to form terminal sockets, a filling spout extending through the top of the tank and communicating with the liquid containing chamber, a pump associated with the tank, and an auxiliary conducting pipe connected with the pump and adapted to engage the sockets in the reinforcing bars.

4. A tank including a semi-cylindrical body portion having a liquid containing chamber and provided with a cover spaced transverse bars engaging the cover and having their opposite ends provided with sockets, reinforcing rods embracing the exterior walls of the tank and having their terminals threaded and extended vertically through the reinforcing bars, nuts engaging the threaded ends of the rods and bearing against the adjacent bars for locking the latter in engagement with the cover, and a filling spout extending through the cover of the tank and having its lower end communicating with the interior of the tank and its upper end extended vertically above the top of the tank.

5. A tank including a body portion provided with a liquid receiving chamber and having one end thereof reduced to form an auxiliary liquid containing chamber, bars extending transversely across the top of the tank, reinforcing rods embracing the exterior walls of the tank and engaging the transverse bars, a filling spout extended through the top of the tank and communicating with the main chamber, pivoted closures for the auxiliary chamber, and a discharge pipe extending through the auxiliary chamber and communicating with the interior of the main chamber.

6. The combination with a wheeled truck, of a tank secured to the truck and provided with main and auxiliary liquid receiving chambers, transverse bars extending across the top of the tank and provided with terminal sockets, a spout extended through the top of the tank and communicating with the interior of the main chamber, and a discharge spout extending through the auxiliary chamber and communicating with the main chamber.

7. The combination with a wheeled truck having bolsters secured thereto and provided with concaved faces, a substantially cylindrical tank seated in the concaved faces of the bolsters and provided with a main liquid containing chamber, one end of the tank being reduced to form an auxiliary containing chamber, a filling spout extending through the top of the tank and communicating with the interior of the main chamber, a closure for the auxiliary chamber, a discharge pipe extending through the auxiliary chamber and communicating with the interior of the main chamber, and reinforcing bars extended transversely across the top of the main tank and provided with terminal sockets for the reception of a hose.

8. The combination with a wheeled truck, of a tank mounted on the truck and provided with independent liquid containing chambers, transverse bars secured to the top of the tank and having their opposite ends extended laterally beyond the adjacent longitudinal edges of the tank, a filling spout having its upper end extended vertically above the top of the tank and its opposite end communicating with one of the chambers, a discharge pipe opening in said chamber and extending through the opposite chamber, a pump mounted on the top of the tank and provided with a detachable water conducting hose, there being sockets formed in the opposite ends of the transverse bars and adapted to receive the hose when the latter is disconnected from the pump.

In testimony that I claim the foregoing as my own, I have hereto affixed my signature in the presence of two witnesses.

JOHN CHIAL.

Witnesses:
  J. E. BEKKE,
  O. C. HAGE.